United States Patent

[11] 3,626,906

| [72] | Inventors | Willis R. Voran |
| | | Zeeland, Mich.; |
| | | Harvey Z. Burkholder, Ethrata, Pa. |
| [21] | Appl. No. | 692,841 |
| [22] | Filed | Dec. 22, 1967 |
| [45] | Patented | Dec. 14, 1971 |
| [73] | Assignee | U.S. Industries, Inc. |
| | | New York, N.Y. |

[54] EGG GUARD FOR POULTRY CAGES
5 Claims, 3 Drawing Figs.

[52] U.S. Cl. ................................................ 119/48
[51] Int. Cl. ........................................... A01k 31/16
[50] Field of Search ............................... 119/48, 18

[56] References Cited
UNITED STATES PATENTS
2,756,721   7/1956   Hayes .......................... 119/48

3,208,430   9/1965   Ernst ............................ 119/18
3,313,271   4/1967   Graves ......................... 119/48

FOREIGN PATENTS
445,449   4/1936   Great Britain ................ 119/18

Primary Examiner—Hugh R. Chamblee
Attorney—Price, Heneveld, Huizenga and Copper

ABSTRACT: An egg guard for poultry confinement cages of the type having openings at the juncture of a side and the bottom of the cage through which eggs laid in the cage may move outwardly to be collected, the egg guard comprising an elongated member extending along the aforesaid juncture of side and bottom and over the egg-passage openings and having a smoothly curved cross-sectional configuration devoid of angular corners.

PATENTED DEC 14 1971    3,626,906

INVENTORS
WILLIS R. VORAN
HARVEY Z. BURKHOLDER
BY
Price, Heneveld
Huizenga & Cooper
ATTORNEYS

EGG GUARD FOR POULTRY CAGES

BACKGROUND

The keeping of poultry within confinement cages is becoming increasingly popular in recent years as a result of the operating economies and efficiencies which such cages make possible. When confinement cages are used for laying birds being kept for egg production, the cages are arranged so that eggs laid within them can be collected automatically; generally, this is accomplished by slanting or inclining the floor somewhat so that the eggs will roll toward the front wall of the cages. Openings through which the eggs may pass are formed at the juncture of the front wall and the floor or bottom of the cage, so that eggs laid in the cage will roll down the inclined floor, pass through these openings, and leave the cages, outside which they normally roll directly onto a conveyor means and are automatically collected.

In actual practice, however, the eggs often collect in the area of the aforesaid egg-outlet openings in the cages and remain there for at least moderate intervals. This is largely (although not exclusively) a result of the fact that the collection conveyors are not run continuously day and night but only at selected times, since there obviously are many periods during each day when all of the eggs then available have been collected and it would be wasteful to merely run the conveyors continuously. It has long been known that the eggs temporarily remaining in the vicinity of the outlet openings are highly susceptible to being damaged by the chickens in the cages. This damage is not limited merely to outright breakage, although this definitely occurs, but the eggs also suffer cracking, checking, and pinhole breakage, which is clearly unsatisfactory but is very difficult to detect and, in the past, impossible to eliminate or even substantially reduce.

Because of the foregoing situation, egg guards have for some time been used in cages used for laying birds. These guards in essence comprise a sheet metal shield extending at least partially over the egg-outlet openings, for the basic purpose of preventing the birds from standing or resting their feet directly upon the eggs located near such openings. The mere presence of such a guard or shield in this area has not in practice proved to be sufficient to stop all damage done to the eggs, even though it does largely prevent the chickens from crushing the eggs by standing directly upon them. It has previously been observed, for example, that the chickens would, in extending their heads and necks out of the cages to obtain feed and water, peck at eggs moving past them on the automatic egg-collection conveyors. As a consequence of this, certain protective devices have been devised such as are shown in U.S. Pat. No. 3,313,271, owned by the assignee of the present invention.

Moreover, the feet of the birds in the cages continue to do damage of the checking and pinholing variety, and many different versions of and variations in egg guards have been devised in an attempt to stop this source of damage. For example, egg guards have been provided which were (as observed from within the cages) concave as well as convex; also, the specific cross-sectional configuration of the egg guards has been varied extensively. Egg guards have been tried, for example, which were a simple flat sheet of metal extending partially across the interior corner formed by the front side and the floor of the cages; also, egg guards have been tried whose cross-sectional configuration consisted of any number of angularly related plane surfaces formed by longitudinally bending a sheet of metal.

Experiments and efforts of the foregoing type have definitely produced improvements and helped to diminish the basic problem; however, until the advent of the present invention, moderately high pinhole damage has always existed, the precise source of which was unknown. The present inventors have determined that this damage results from an apparent widespread habit of chickens when standing at the front side of the cages to take food and water (provided in troughs immediately adjacent the front side of the cages) of resting one of their feet atop the egg guard. Gradually, a small amount of the weight of the bird is placed on this resting foot, and sooner or later the foot suddenly slips off the egg guard and plunges to the floor of the cage. When this happens, one or the other of the claws or toenails, particularly the claw on the middle toe, which is the longest, is very likely to land upon or strike one of the eggs located in the area generally beneath the egg guard, thereby causing pinhole breakage of such egg. Thus, it has been determined that in order to avoid such breakage an egg guard would have to be provided which would not afford a bird any degree of "purchase" or support for its foot, i.e., a guard which would make a bird's foot or toenails slide downwardly whenever a bird attempted, even though lightly, to place his foot upon it, thereby never affording the bird sufficiently sure footing to place any amount of weight or force on his foot.

The egg guard of the present invention provides such a configuration, in the form of a smoothly rounded guard or shield extending downwardly and over the outlet openings in the cages. The curvature of the guard is of a relatively gradual nature, in which the upper portions extend inwardly of the front side of the cage at a small angle to the horizontal, with the remainder of the guard sweeping downwardly in a smooth curve in which the lower extremity is only at a small angle to true vertical.

DRAWINGS

PREFERRED EMBODIMENT

As illustrated in the figures, the basic conventional arrangement for poultry confinement cages of the type with which the egg guard of the invention is concerned is to have a pair of elongated cage structures such as are seen at 10 and 12, each comprising a series of laterally adjacent and interconnected segments forming individual cages. The two elongated cage structures are arranged in a mutually spaced manner and held in at least a somewhat elevated position by desired standards 14 or other such mounting means not a part of the present invention. In the space between the two cage structures a feeder trough 16 is normally mounted, from which the birds within the cages can take feed. As will be understood, the feeder trough 16 normally forms a part of an automated feeding system, in which a flat conveyor chain or the like moves within the trough to transfer feed along its length. Also, a watering trough arrangement (not specifically shown) is normally mounted between the cages.

Figure 1:
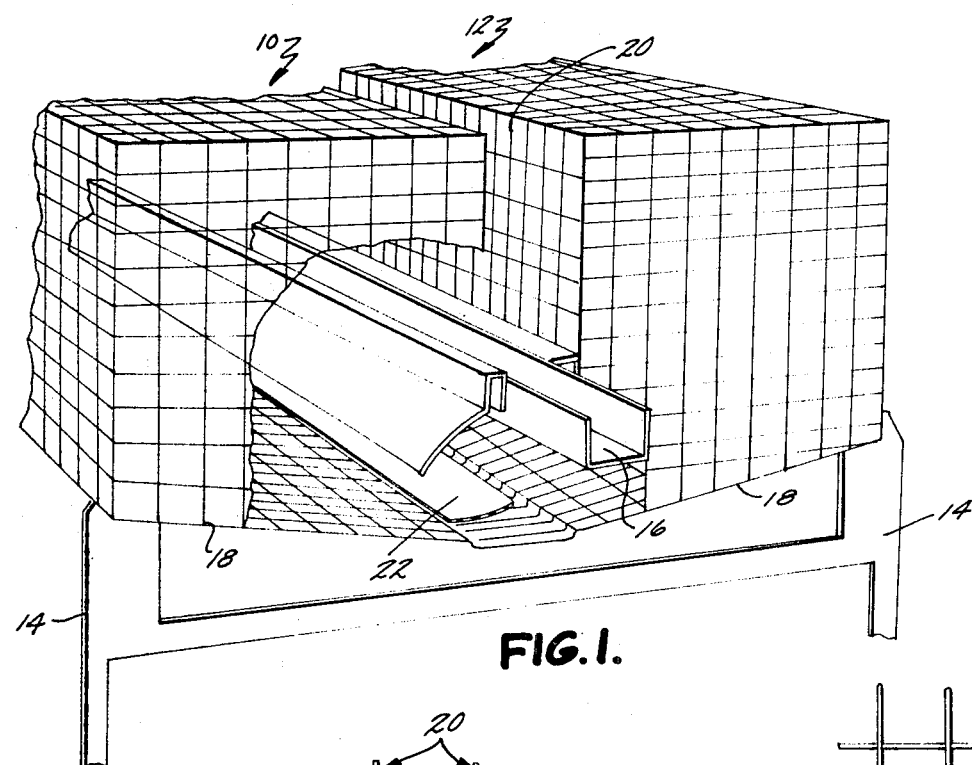
FIG. 1 is a fragmentary perspective view of poultry cages embodying the egg guard of the invention.
Figure 3:
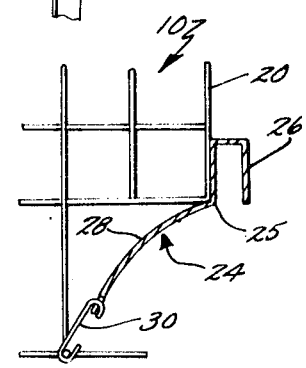
FIG. 3 is an enlarged sectional side elevation showing the curvature of the egg guard.
Figure 2:
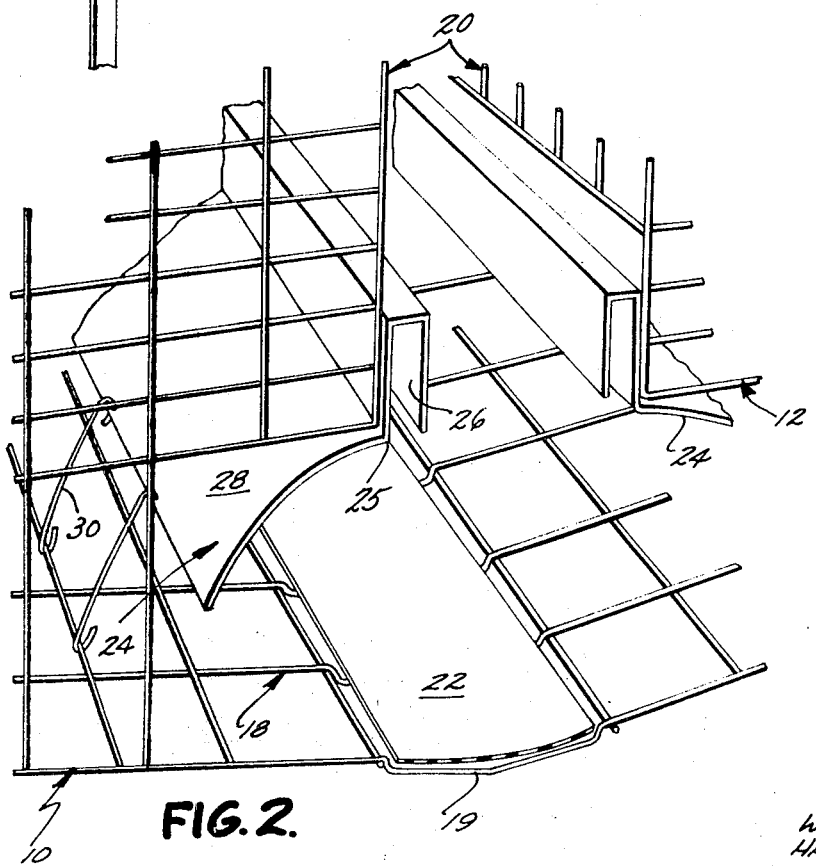
FIG. 2 is an enlarged fragmentary perspective view showing details of the egg guard in association with the cages.

As illustrated, the walls and floor of the cage structures 10 and 12 are formed from mutually intersecting wire rods defining a mesh or openwork construction. The floor portion 18 of each of the cage structures slopes downwardly toward the front side 20 of the cages, i.e., that side portion which is closest to the other row of cages in the two spaced structures. The floor of the entire cage structure is an integral one-piece member, there being an interconnecting portion 19 (FIG. 2) which bridges the floor portions 18 of each of the two cage structures 10 and 12. A movable conveyor member 22, preferably a belt of jute or the like, rides upon this central or interconnecting floor portion 19 which may form a depression for receiving and guiding the belt.

The front sides 20 of the two cage structures terminate above the floor portions 18 thereof, in substantial vertical alignment with an edge of the conveyor belt guiding floor portion 19, leaving an opening therebetween. This arrangement is such that eggs laid inside the cages by the poultry confined therein will roll down the inclined floor portions 18, through the aforesaid opening at the intersection of the front sides and floor portions, and onto the belt 22, which automatically conveys the eggs to a central place of collection. The novel egg guard 24 of the invention extends lengthwise along each cage structure to shield and partially cover the aforesaid opening at the juncture of the front side and floor portion thereof, i.e., it is located along the projected intersection of the front side and the floor. The cross section of the egg guard 24 preferably defines an elongated corner 25, into which the lowermost extremity of the front side of the cages fits, and the guard may extend externally of the cages to form a downwardly-opening channel 26 which may serve as a support and positioning member for the feeder trough to be located between the cage structure.

The essential part of the egg guard is its smoothly curved skirtlike portion 28 which extends inside the cages, across the corner where the front and bottom of the cages effectively meet or adjoin each other. As illustrated, this curved skirt portion is entirely devoid of any angular corners, whether convex or concave in nature. Its top portion extends inwardly of the front side 20 of the cage at at least a slight acute angle to the horizontal (less than about 45°), whereas its lower extremities become gradually more and more vertical and terminate at a similar small acute angle with respect to the true vertical. At its bottom edge, the skirt portion 28 is attached to the floor 18 of the cage at spaced intervals, preferably through the use of hooklike wire members 30 extending through holes formed along the bottom of the skirt portion 28 and passing around some of the rods forming the meshlike floor portions 18. As will be understood, the channellike upper portions 26 of the egg guard are held in place against the front sides 20 of the cages to ensure the proper positioning of the egg guards, but this may be accomplished in any desired manner.

The gradually curved nature of the egg guard skirt portion 28 is extremely important, since this construction eliminates the angular corners and/or projecting edges found in other egg guards. Such corners, even though somewhat rounded, have in he past furnished enough of a foot-hold for the birds in the cages to succeed in resting one of their feet and at least a slight part of their weight upon the egg guard and, as a result of the ever-present tendency of the birds to rest increasing amounts of weight on the raised foot, have provided the source by which the bird's claws or toenails have steadily and regularly been chipped and/or broken to cause pinhole damage of the eggs. The smoothly curved egg guard of the present invention, on the other hand, eliminates any such corners or the like, with the result that when the birds left one of their feet and attempt to rest it upon the guard, the foot immediately slips downward and off the guard as soon as the bird relaxes his leg. Absolutely no foot-hold is provided, and no weight can be placed on the raised foot; in fact, there is not even enough of a foot-hold to arrest the foot alone, without any weight placed upon it. Further, there are no corners in the curved egg guard to catch the claws or toenails of the birds as their feet slip quickly off the guard. Consequently, the claws of the birds do not become broken when the egg guard of the present invention is used, and an important source of egg damage is thus eliminated.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. In a confinement cage for housing poultry and the like, of the type having a floor arrangement for causing eggs laid by such poultry to move toward a side of the cage and to an egg collection means disposed adjacent such side and also having an opening generally between such side and said floor through which such eggs may pass to reach such collection means, and of the type having an egg guard means mounted generally over such opening to shield eggs located thereabout and protect the same from injury by the poultry within the cage, the improvement wherein said egg guard means comprises an elongated member having shield portions located within said cage at least partially above and alongside said opening, said shield portions being generally convex in their entirety as viewed from within the cage and describing a broad curve extending generally inwardly and downwardly from said side toward said floor, said portions being devoid of angular corners in their said contour.

2. The improvement in poultry cage egg guard means of claim 1, wherein said shield portions are curved over substantially all of their entirety and throughout their medial extremities.

3. The improvement in poultry cage egg guard means of claim 1, wherein said shield portions extend longitudinally along and at least partly over a corner of such cage defined by said side and floor, and wherein said shield portions are located such that it extends across the inside of said corner, said portions including a part extending inwardly of said side at a small downward acute angle relative to true horizontal and a part extending upwardly away from said floor at no more than a small acute angle to true vertical.

4. The improvement in poultry cage egg guard means of claim 3, wherein said shield portions are curved over substantially all of their entirety and throughout their medial extremities.

5. The improvement in poultry egg guard means of claim 1, wherein said side of said cage is in generally direct vertical alignment with at least a portion of said egg collection means, and said shield portions curve convexly inwardly and downwardly into the cage from said side.

* * * * *